US008042040B2

(12) United States Patent
Lynton

(10) Patent No.: US 8,042,040 B2
(45) Date of Patent: Oct. 18, 2011

(54) SYSTEMS AND METHODS FOR MOUNTING MEMORABILIA

(75) Inventor: Jeanette R. Lynton, Alpine, UT (US)

(73) Assignee: Cabin Creek, LLC, Pleasant Grove, UT (US)

( * ) Notice: Subject to any disclaimer, the term of this patent is extended or adjusted under 35 U.S.C. 154(b) by 674 days.

(21) Appl. No.: 11/601,571

(22) Filed: Nov. 17, 2006

(65) Prior Publication Data

US 2008/0120535 A1    May 22, 2008

(51) Int. Cl.
*G06F 17/00* (2006.01)
(52) U.S. Cl. ........ 715/247; 715/243; 715/246; 715/249; 715/253; 281/22
(58) Field of Classification Search .......... 715/243–253; 281/22
See application file for complete search history.

(56) References Cited

U.S. PATENT DOCUMENTS

| | | | | |
|---|---|---|---|---|
| 3,735,516 A * | 5/1973 | Wenstrom | | 40/536 |
| 5,233,513 A * | 8/1993 | Doyle | | 705/7 |
| 5,900,002 A * | 5/1999 | Bottomly | | 715/209 |
| 6,097,389 A | 8/2000 | Morris et al. | | |
| 6,222,947 B1 * | 4/2001 | Koba | | 382/284 |
| 6,230,173 B1 | 5/2001 | Ferrel et al. | | |
| 6,358,341 B1 | 3/2002 | Bergquist | | |
| 6,418,635 B1 * | 7/2002 | Nelson et al. | | 33/563 |
| 6,596,032 B2 * | 7/2003 | Nojima et al. | | 715/247 |
| 6,660,119 B2 * | 12/2003 | Allen et al. | | 156/226 |
| 6,690,843 B1 * | 2/2004 | Squilla et al. | | 382/306 |
| 7,082,436 B1 | 7/2006 | Bayiates | | |
| 7,177,045 B2 | 2/2007 | Goel et al. | | |
| 7,327,905 B2 * | 2/2008 | Tsue et al. | | 382/305 |

(Continued)

FOREIGN PATENT DOCUMENTS

KR    10-2008-0108927    12/2008

OTHER PUBLICATIONS

Microsoft Publisher 2003; 2003; Microsoft Corporation.*

(Continued)

*Primary Examiner* — Doug Hutton, Jr.
*Assistant Examiner* — Andrew Dyer
(74) *Attorney, Agent, or Firm* — David B. Tingey; Kirton & McConkie

(57) ABSTRACT

Systems and methods for mounting memorabilia in a manner that provides enhanced opportunity for the creative involvement of users. A page layout template is used as a basis for creating a page layout to which design elements are attached. The page layout is a pre-designed template that is configured to be selectively rotated and/or swapped to provide a refreshing theme and/or look, and can be used to more effectively utilize the memorabilia available for mounting and/or storage. The ability to rotate and/or swap the templates enables the ability of a user to reuse pre-established templates to create new looks and presentations. In addition, colors and/or objects can be added to enhance the themes. In one implementation, the templates include two templates per presentation. Each of the templates can be selectively rotated and/or swapped with another template to provide a refreshing theme and/or look, and can be used to more effectively utilize the memorabilia available for mounting and/or storage.

12 Claims, 7 Drawing Sheets

U.S. PATENT DOCUMENTS

| | | |
|---|---|---|
| 7,474,801 B2 | 1/2009 | Teo et al. |
| 7,689,909 B1 | 3/2010 | Szuszczewicz |
| 2003/0020956 A1* | 1/2003 | Goel et al. .................. 358/1.18 |
| 2003/0160824 A1 | 8/2003 | Szumla |
| 2003/0167447 A1 | 9/2003 | Hatta et al. |
| 2004/0088420 A1 | 5/2004 | Allen et al. |
| 2004/0194034 A1 | 9/2004 | Vlamis |
| 2004/0201613 A1* | 10/2004 | Simpson et al. ............. 345/738 |
| 2004/0250205 A1 | 12/2004 | Conning |
| 2005/0253371 A1* | 11/2005 | Connolly ........................ 281/22 |
| 2006/0038835 A1* | 2/2006 | Cao ............................... 345/655 |
| 2006/0059427 A1 | 3/2006 | Reid et al. |
| 2006/0109516 A1* | 5/2006 | Catalan et al. ................ 358/302 |
| 2007/0033542 A1 | 2/2007 | Winser et al. |
| 2007/0043830 A1 | 2/2007 | Housenbold et al. |
| 2007/0253029 A1 | 11/2007 | Yamaguchi |
| 2008/0215964 A1 | 9/2008 | Abrams et al. |
| 2008/0228866 A1* | 9/2008 | Minatogawa et al. ........ 709/203 |

OTHER PUBLICATIONS

Microsoft Publisher 2003 Screenshots; Figs. 1-26; pp. 1-17.*

Lynton, Jeanette R., *"Cherish"* (ISBN 978-1-4236-0154-8), 2005, Gibbs Smith, Layton, UT, pp. 1-128.

Lynton, Jeanette R., *"Imagine"* (ISBN 978-1-4236-0436-5) (referred to in the Office Action as "Snow"), 2007, Gibbs Smith, Layton, UT, pp. 1-128.

Lynton, Jeanette R., *"Originals"* (ISBN 978-1-4236-0436-5), 2008, Gibbs Smith, Layton, UT, pp. 1-128.

Lynton, Jeanette R., *"Reflections"* (ISBN 978-1-4236-0311-5), 2007, Gibbs Smith, Layton, UT, pp. 1-127.

Lynton, Jeanette R., *"Wishes"* (ISBN 978-4236-0437-2), 2009, Gibbs Smith, Layton, UT, pp. 1-128.

www.shutterfly.com, Aug. 2005, pp. 1-7.

* cited by examiner

SYSTEMS AND METHODS FOR MOUNTING MEMORABILIA

BACKGROUND OF THE INVENTION

1. Field of the Invention

The present invention relates to the presentation and/or storage of memorabilia and/or other elements. In particular, the present invention relates to dynamic systems and methods for presenting and/or storing memorabilia and/or other elements.

2. Background and Related Art

Photographs can be placed in albums of varying styles, where they are mounted for viewing on one or more pages in a format resembling a book. Such book-like formats are photo albums or scrapbooks that permit the convenient storage of photographs.

While book-like formats are currently available, challenges still exist. One such example is that in some book-like formats the photographs are simply placed into the photo album without much variation. Accordingly, the presentation remains lacking. Another example is that while some book-like formats have been used to provide a personal touch to the overall look of the page layout, a challenge exists in the ability to provide new, refreshing and creative looks to the pages.

Thus, while techniques currently exist that are used to assist persons mounting photographs, challenges still exist. Accordingly, it would be an improvement in the art to augment or even replace current techniques with other techniques.

SUMMARY OF THE INVENTION

The present invention relates to the presentation and/or storage of memorabilia and/or other elements. In particular, the present invention relates to dynamic systems and methods for presenting and/or storing memorabilia and/or other elements in a manner that provides enhanced opportunity for the creative involvement of users.

Implementations of the present invention take place in association with a page layout template that can be used as a basis for creating a page layout to which design elements are attached. In at least some implementations, a page layout is used to create a page for inclusion within a scrapbook, where memories are recorded and memorabilia objects, including photographs, are selectively affixed and stored.

The page layout is a pre-designed template that is configured to be selectively rotated and/or swapped to provide a refreshing theme and/or look, and can be used to more effectively utilize the memorabilia available for mounting and/or storage. The ability to rotate and/or swap the templates enables the ability of a user to reuse pre-established templates to create new looks and presentations. In addition, colors and/or objects can be added to enhance the themes. In one implementation, the templates include two templates per presentation. Each of the templates can be selectively rotated and/or swapped with another template to provide a refreshing theme and/or look, and can be used to more effectively utilize the memorabilia available for mounting and/or storage.

While the methods and processes of the present invention have proven to be particularly useful in the area of scrap booking, photo albums, and journal keeping, those skilled in the art can appreciate that the methods and processes can be used in a variety of different applications and in a variety of different areas of manufacture to yield improvements in the characteristics of systems and methods that are used to arrange materials in useful ways and creative presentations.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to the presentation and/or storage of memorabilia and/or other elements. In particular, the present invention relates to dynamic systems and methods for presenting and/or storing memorabilia and/or other elements in a manner that provides enhanced opportunity for the creative involvement of users.

Embodiments of the present invention take place in association with a page layout template that can be used as a basis for creating a page layout to which design elements are attached. In at least some embodiments, a page layout is used to create a page for inclusion within a scrapbook, where memories are recorded and memorabilia objects, including photographs, are selectively affixed and stored.

In at least some embodiments, the page layout is a pre-designed template that is configured to be selectively rotated and/or swapped to provide a refreshing theme and/or look, and can be used to more effectively utilize the memorabilia available for mounting and/or storage. The ability to rotate and/or swap the templates enables the ability of a user to reuse pre-established templates to create new looks and presentations. In addition, colors and/or objects can be added to enhance the themes. In one embodiment, the templates include two templates per presentation. Each of the templates can be selectively rotated and/or swapped with another template to provide a refreshing theme and/or look, and can be used to more effectively utilize the memorabilia available for mounting and/or storage.

Figure 1:
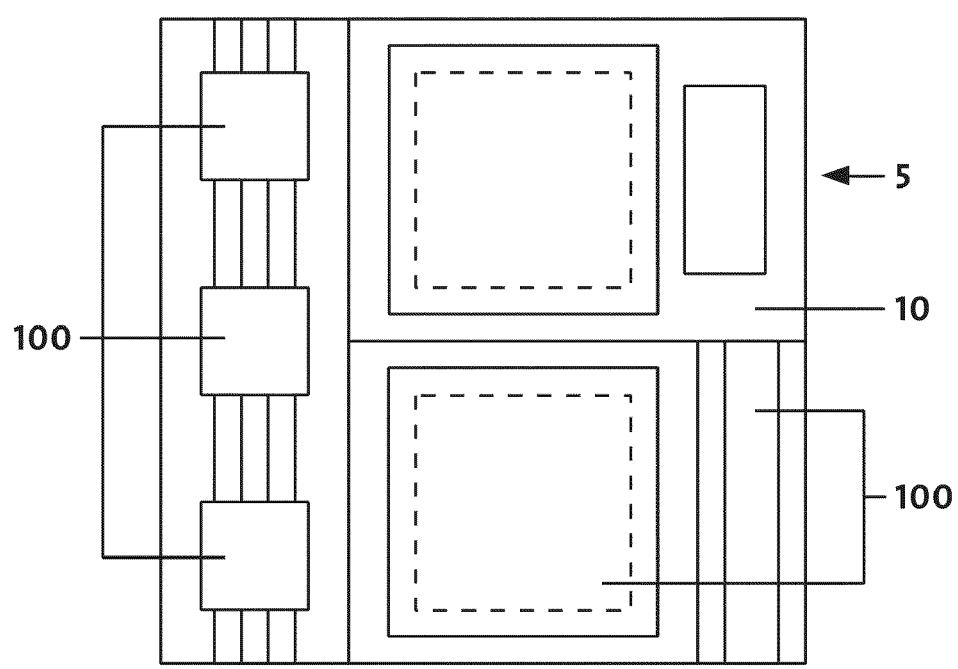
FIG. 1 illustrates a representative embodiment of the present invention.

With reference now to FIG. 1, a representative system is illustrated. In FIG. 1, system 5 comprises a page layout template 10 that can be illustrated in any number of formats and comprises one or more design elements 100 that are intended as guides to a user to illustrate suggested placement of components of memorabilia to be mounted on a page that is created by the user based upon the page layout template 10.

Figure 2:
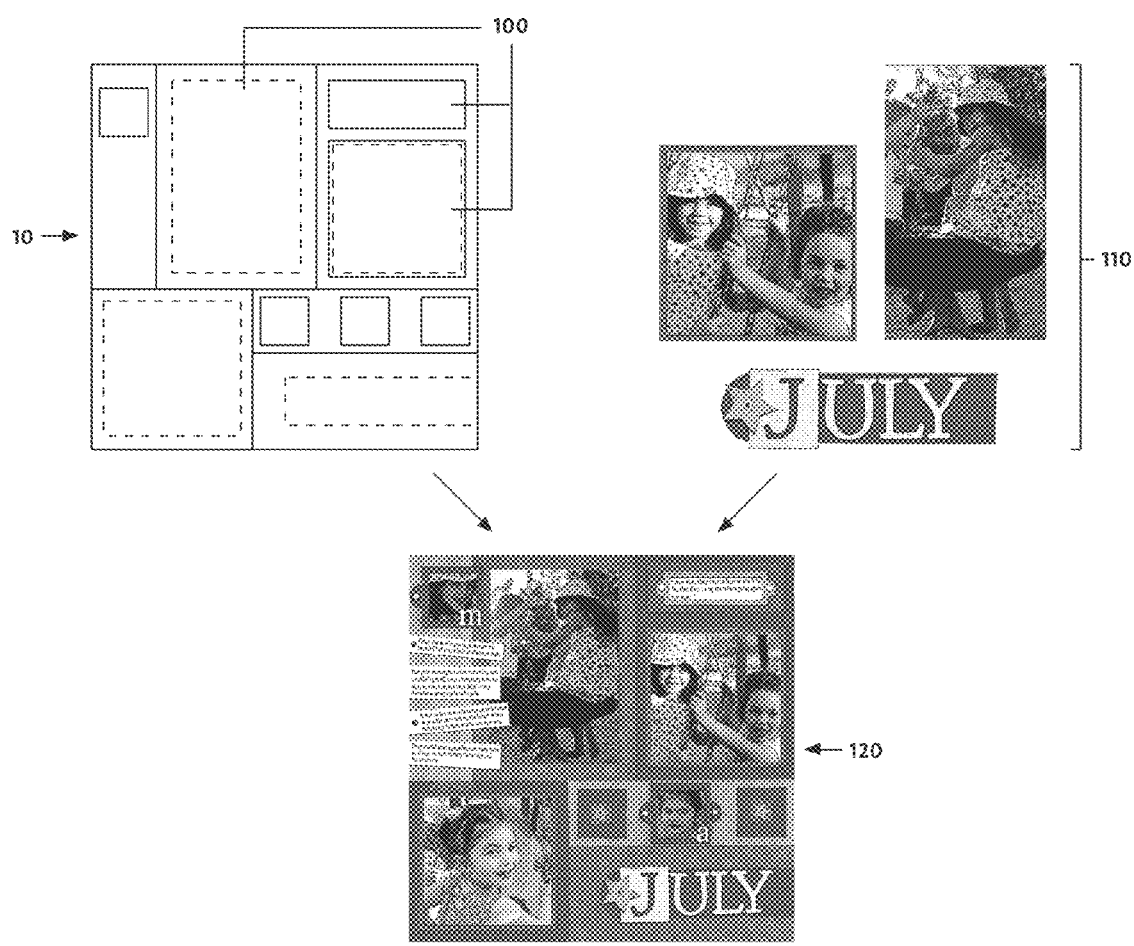
FIG. 2 illustrates a representative embodiment of the present invention.

In FIG. 2, design elements 100 (herein referred to as elements) can comprise any object or information that a user of the present invention wishes to mount or include as part of a completed project 120. A user can rely on the structure and design presented within a page layout template 10 in mounting memorabilia objects and information 110 within a completed project 120. Memorabilia objects and information 110 can comprise, as non-limiting examples, many varieties of photographs, statements comprising journal entries or other descriptive text, stamped or embossed papers, ticket stubs, drawings, montages, newspaper clippings, website printouts, artwork, awards, locks of hair, pine needles, sand, tinsel, flowers, mistletoe, and others.

Figure 3:
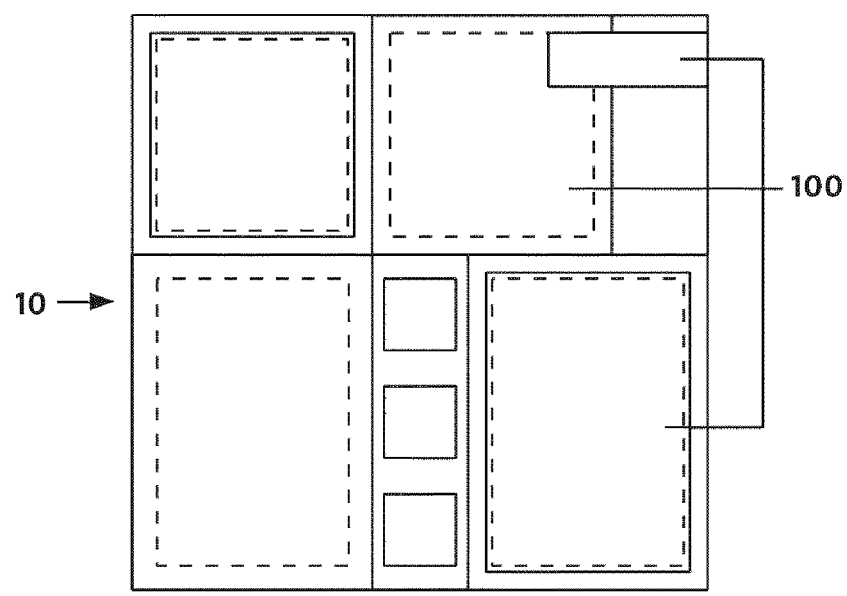
FIG. 3 illustrates another representative embodiment of the present invention.

In at least some embodiments of the present invention, as shown in FIG. 3, page layout template 10 comprises a substantially square shape having multiple elements 100. According to some aspects, a page layout template, such as page layout template 10, is designed so that its structure, functionality, and aesthetic appeal remain when the page layout template 10 is rotated about its center in increments of ninety degrees, while at the same time providing desirable variation as will be further discussed below.

Figure 4:
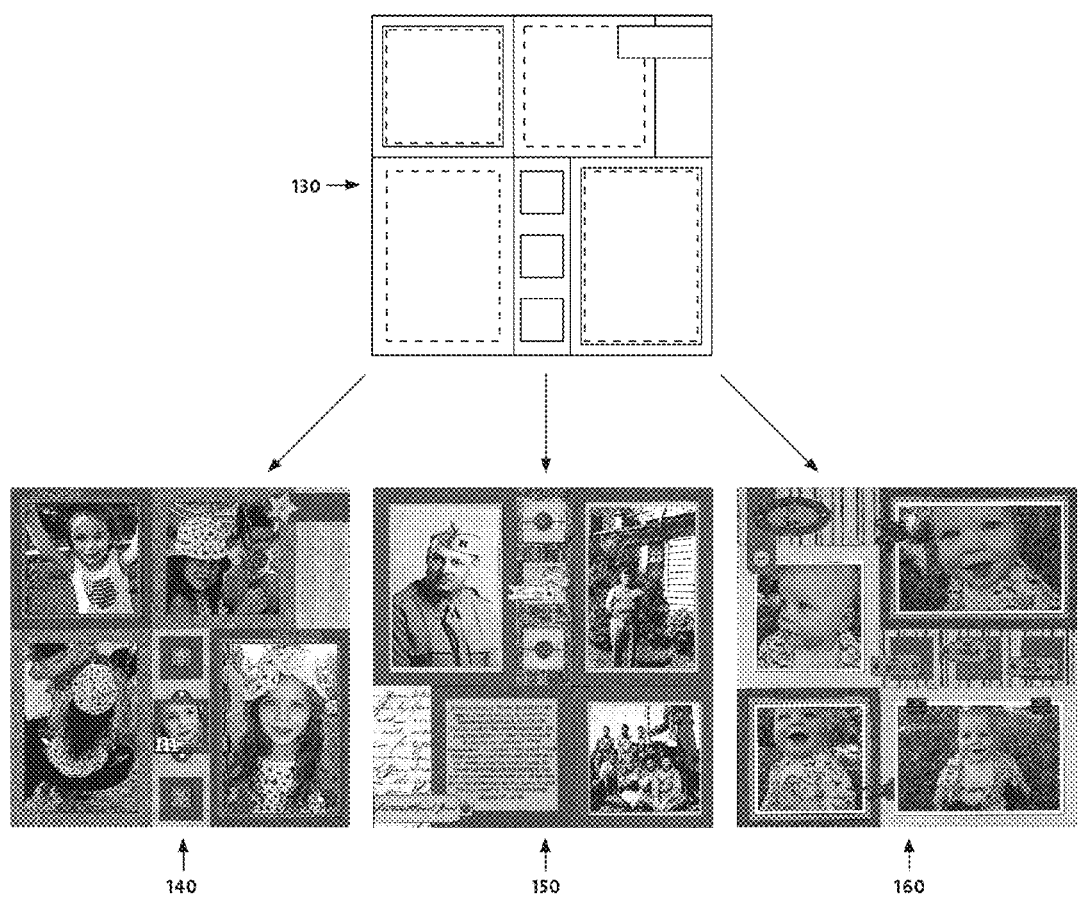
FIG. 4 illustrates a representative embodiment of the present invention when implemented by a user in multiple rotational orientations.

By way of example, FIG. 4 illustrates a page layout template 130 according to one embodiment of the present invention, wherein the page layout template 130 has been used as the basis to create three exemplary instances of a completed design in accordance with the guidance provided by the page layout template 130. In the first completed design 140, the page layout template 130 is used in the same orientation as shown for the page layout template 130 standing alone. In the second completed design 150, the page layout template 130 is used with a rotation of one-hundred-eighty degrees from the orientation shown for the page layout template 130 standing alone. In a third completed design 160, the page layout template 130 is used with a rotation of ninety degrees counter-clockwise from the orientation shown for the page layout template 130 standing alone. In each of the exemplary rotations 140, 150, 160, the functionality of the page layout template 130 remains even when the page layout template is rotated about its center in increments of ninety degrees, while at the same time providing desirable variation. Accordingly, the rotatable template is a guide to creating a workable finished page layout comprising multiple elements.

While a page layout template 10 according to some embodiments of the present invention is useful for guiding a user in creating a scrapbook page, many other uses of the same flexible layout template technique will be apparent to those skilled in the art. Examples include, without limitation, templates of a similar manner, wherein the template may be rotated to achieve a variety of structural design effects, such as greeting card templates, photo album templates, gift templates, personal journal templates, etc.

In some aspects, embodiments of the present invention may comprise multiple page layout templates used in conjunction with one another, such as, without limitation, a two-page spread as may be found within a scrapbook, photo album, or journal. By providing multiple page layout templates according to the embodiments already described, the flexibility of such embodiments can be increased by providing multiple page layout templates, each of which may be used in multiple rotational configurations with one or more other page layout templates.

Figure 5:
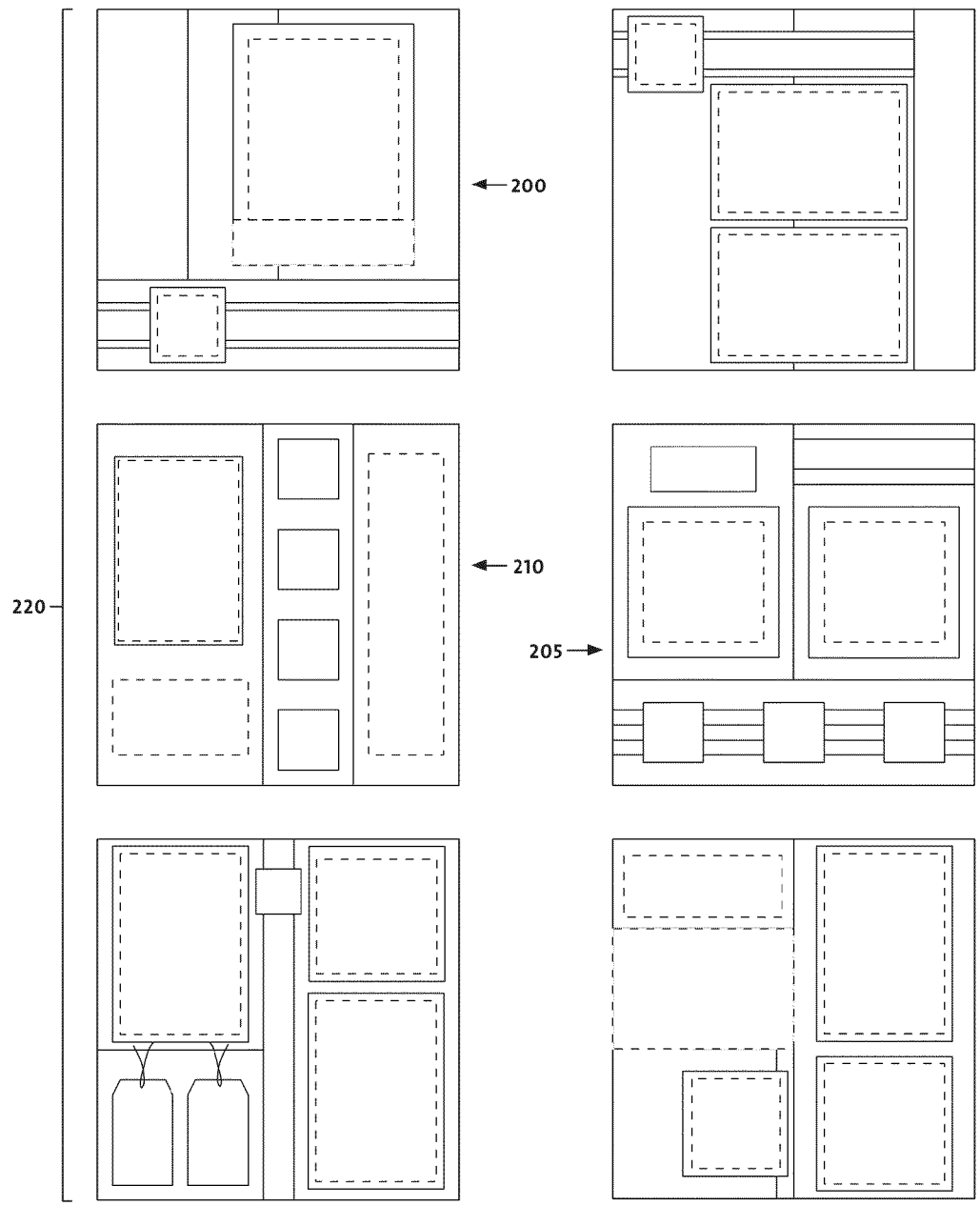
FIG. 5 illustrates a set of page layout templates according to a representative embodiment of the present invention.

According to one embodiment in which multiple page layout templates are provided, as shown in FIG. 5, a user can select a first page layout template 200. The user can then select a second page layout template 210. Accordingly, for example, template 200 can be to the left and template 210 can be to the right in a two page layout presentation. Each of the page layout templates can be rotated, including, without limitation, being rotated about its center in ninety degree increments.

For a second multi-page layout, the user can reuse one of the previously selected templates (e.g., template 200) and select another page layout template (e.g., template 205) to create a new multi-page layout presentation. Accordingly, for example, template 200 can be to the left and template 205 can be to the right in a two page layout presentation. Each of the page layout templates can be rotated, including, without limitation, being rotated about its center in ninety degree increments to provide additional variation.

For another multi-page layout, the user can reuse same templates (e.g., templates 200 and 205) and change the order of the templates. Accordingly, for example, template 205 can be to the left and template 200 can be to the right in a new two page layout presentation. Again, each of the page layout templates can be rotated, including, without limitation, being rotated about its center in ninety degree increments to provide additional variation.

Thus, a user can effectively swap any page layout template for any other page layout template from a given collection 220 of page layout templates constructed according to embodiments of the present invention. In accordance with further embodiments, a user can selectively rotate each selected page layout template to a desired configuration prior to or during use as part of a specific user-initiated project.

According to some embodiments, more than two page layout templates can be selected from a given set of page layout templates, and each one rotated to a desired configuration to meet a specific design need.

In some embodiments, a page layout template is provided in a square configuration to simplify the use of a rotated page layout template within a physical structure such as an album in which completed projects based upon one or more page layout templates are retrained by a user. In one embodiment, page layout templates comprising 12-inch by 12-inch designs are used. Those skilled in the art will appreciate the embodiments of the present invention embrace a variety of shapes, configurations, and/or sizes, including larger than 12-inches, and/or smaller than 12 inches.

The features and techniques discussed thus far demonstrate that a relatively small number of page layout templates provided according to the embodiments above may result in a very large number of structurally usable page layout templates for end-user projects, thus providing greatly increased flexibility to the creative efforts of a user of such page layout templates, while nevertheless providing sufficient guidance so as to enable users who are less skilled in layout or page design to prepare competent finished projects.

Figure 6:
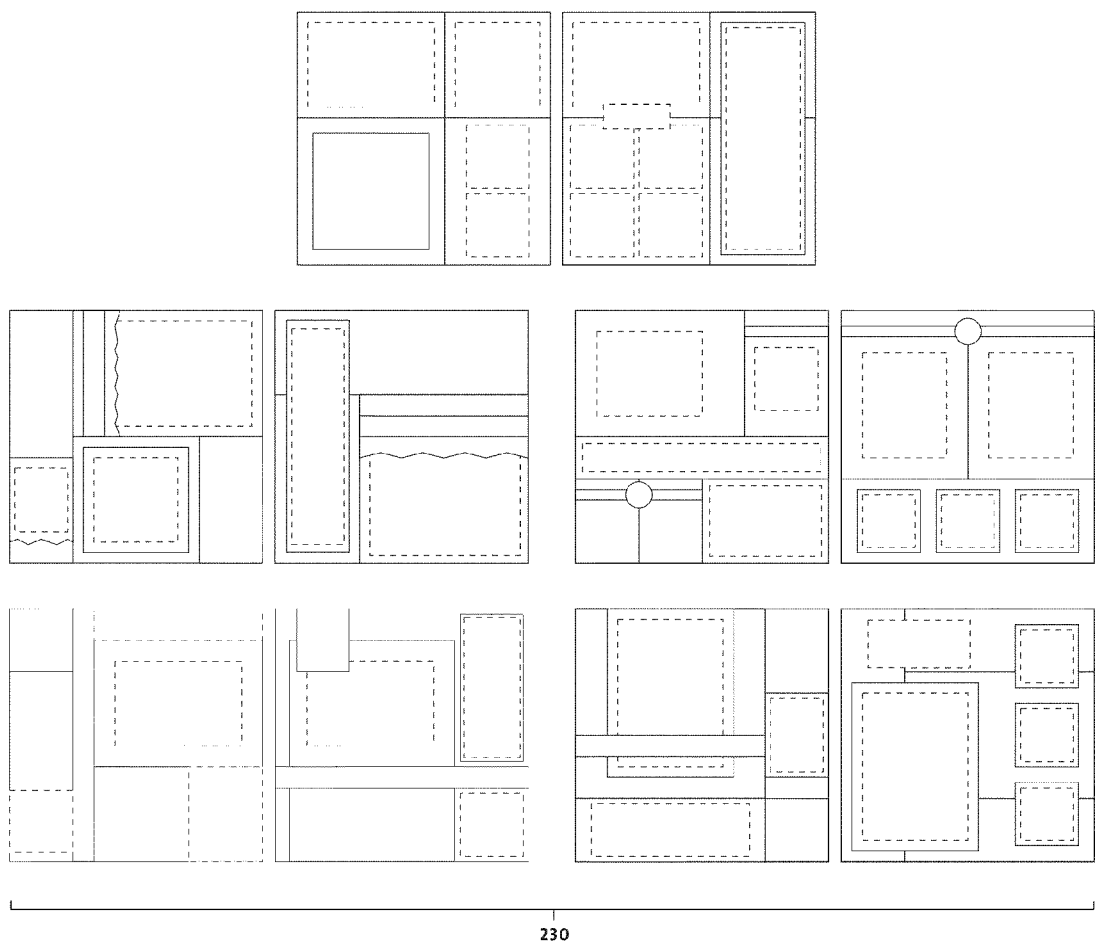
FIG. 6 illustrates a set of two-page spread page layout templates according to a representative embodiment of the present invention.

As an example of the foregoing, consider a collection of five two-page page layout templates 230 as illustrated in FIG. 6, where a user wishes to avoid repeating the same layout on any of ten pages within a planned project. If used in a static manner—without rotation and without swapping pieces of the two-page layout to other two-page layouts—the total number of possible configurations for the finished project may be calculated according to this formula: 5×4×3×2×1, where the first two-page spread may be selected from any of five possible static two-page layouts, the second two-page spread may be selected from any of the four remaining static two-page layouts, and so forth. The resulting formula yields 120 possible configurations to which the user may apply his or her creative skills.

If, however, the techniques disclosed herein are used with page layout templates constructed according to some embodiments of the present invention, wherein each page of a two-page spread may be selected individually from all ten available pages in the provided collection, and wherein each such selected page may be rotated to any of four rotational configurations (0, 90, 180, or 270 degrees), then it is apparent that the user may select from 10×4 possible configurations for the first page of the first two-page spread, (10×4)-1 possible configurations for the second page of the first two-page spread (assuming for purposes of this illustration that no configuration is to be repeated), (10×4)-2 possible configurations for the first page of the second two-page spread, and so forth for all ten pages. Thus, the formula to calculate the possible configurations that may be constructed using the five two-page spread page layout templates when constructed according to the embodiments discussed will be 40×39×38× 37×36×35×34×33×32×31. The resulting total possible configurations are more than $3×10^{15}$. Yet, as discussed above, this increase in creative possibility for users of the disclosed system is provided within a framework in which a page layout template is provided to guide the implementation of a project, so that beginning users or those unfamiliar with principles of sound design may rely on the page layout templates as formatting guides.

One method of using the present invention comprises the following steps:

A set of multiple page layout templates is provided, wherein each page layout template is designed and constructed in a manner that permits it to retain its design soundness and structural functionality when used in multiple rotational configurations, including, without limitation, rotational configurations at increments of ninety degrees.

A user selects a first page layout template and determines a rotational configuration in which that first page layout template will be used.

The user optionally selects a second page layout template to create a two-page spread with the first page layout template, and determines a rotational configuration in which that second page layout template will be used.

The user mounts memorabilia, paper, elements, and/or items in a design corresponding to the page layout templates selected in previous steps.

In some embodiments, a page layout template may be provided as a usable instantiation, such as a pre-printed paper intended for use within a photo album or scrapbook. In other embodiments, a page layout template may be provided as an illustration within an instructional guide, where the user may refer to that illustration, including, without limitation, the measurements of the illustration or provided adjacent to the illustration, in order to independently construct a page based upon the information provided in the page layout template.

The identified features, characteristics, functions, and advantages described herein are not meant to be limiting in any way. It is contemplated that one skilled in the art will recognize other apparent features and advantages of the various embodiments of the invention other than those specifically recited, described, or mentioned herein. Therefore, while an embodiment of the invention comprising one or more page layout templates is specifically described, such descriptions are provided with the intention of encompassing like-systems or like-devices or like-methods.

Additionally, while not required, those skilled in the art will appreciate that some embodiments of the present invention embrace utilization of dynamic templates with the use of a computer device to create and/or use dynamic templates. Accordingly, FIG. 7 and the corresponding discussion are intended to provide a general description of a suitable operating environment in which methods of the present invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Figure 7:
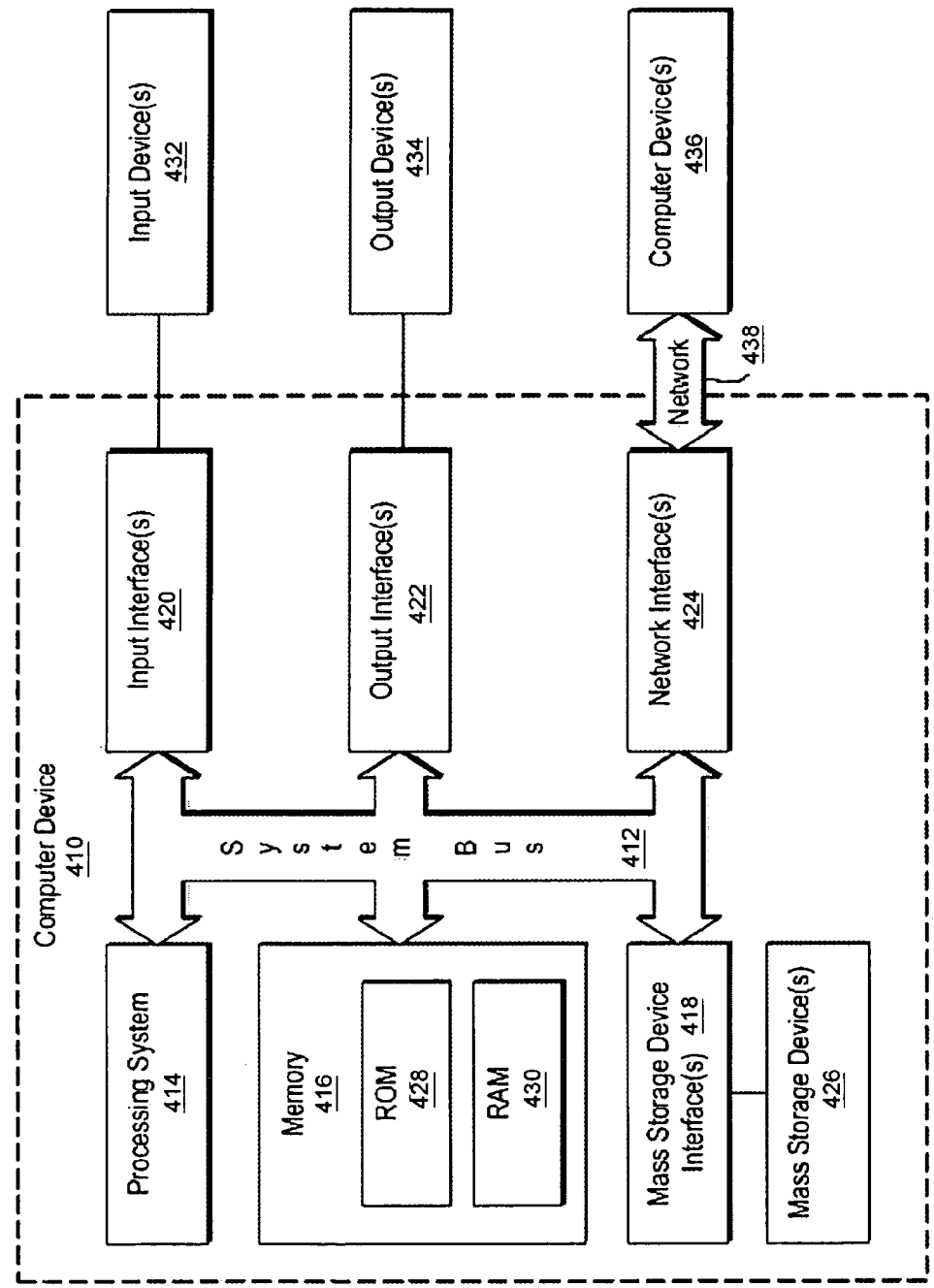
FIG. 7 illustrates a representative computer device for implementing some embodiments of the present invention.

With reference to FIG. 7, a representative system for implementing an embodiment of the present invention includes computer device 410, which may be a general-purpose or special-purpose computer. For example, computer device 410 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 410 includes system bus 412, which may be configured to connect various components thereof and enables data to be exchanged between two or more components. System bus 412 may include one of a variety of bus structures including a memory bus or memory controller, a peripheral bus, or a local bus that uses any of a variety of bus architectures. Typical components connected by system bus 412 include processing system 414 and memory 416. Other components may include one or more mass storage device interfaces 418, input interfaces 420, output interfaces 422, and/or network interfaces 424, each of which will be discussed below.

Processing system 414 includes one or more processors, such as a central processor and optionally one or more other processors designed to perform a particular function or task. It is typically processing system 414 that executes the instructions provided on computer readable media, such as on memory 416, a magnetic hard disk, a removable magnetic disk, a magnetic cassette, an optical disk, or from a communication connection, which may also be viewed as a computer readable medium.

Memory 416 includes one or more computer readable media that may be configured to include or includes thereon data or instructions for manipulating data, and may be accessed by processing system 414 through system bus 412. Memory 416 may include, for example, ROM 428, used to permanently store information, and/or RAM 430, used to temporarily store information. ROM 428 may include a basic input/output system ("BIOS") having one or more routines that are used to establish communication, such as during start-up of computer device 410. RAM 430 may include one or more program modules, such as one or more operating systems, application programs, and/or program data.

One or more mass storage device interfaces 418 may be used to connect one or more mass storage devices 426 to system bus 412. The mass storage devices 426 may be incorporated into or may be peripheral to computer device 410 and allow computer device 410 to retain large amounts of data. Optionally, one or more of the mass storage devices 426 may be removable from computer device 410. Examples of mass storage devices include hard disk drives, magnetic disk drives, tape drives and optical disk drives. A mass storage device 426 may read from and/or write to a magnetic hard disk, a removable magnetic disk, a magnetic cassette, an optical disk, or another computer readable medium. Mass storage devices 426 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 420 may be employed to enable a user to enter data and/or instructions to computer device 410 through one or more corresponding input devices 432. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 420 that may be used to connect the input devices 432 to the system bus 412 include a serial port, a parallel port, a game port, a universal serial bus ("USB"), a firewire (IEEE 1394), or another interface.

One or more output interfaces 422 may be employed to connect one or more corresponding output devices 434 to system bus 412. Examples of output devices include a monitor or display screen, a speaker, a printer, and the like. A particular output device 434 may be integrated with or peripheral to computer device 410. Examples of output interfaces include a video adapter, an audio adapter, a parallel port, and the like.

One or more network interfaces 424 enable computer device 410 to exchange information with one or more other local or remote computer devices, illustrated as computer devices 436, via a network 438 that may include hardwired and/or wireless links. Examples of network interfaces include a network adapter for connection to a local area network ("LAN") or a modem, wireless link, or other adapter for connection to a wide area network ("WAN"), such as the Internet. The network interface 424 may be incorporated with or peripheral to computer device 410. In a networked system, accessible program modules or portions thereof may be stored in a remote memory storage device. Furthermore, in a networked system computer device 410 may participate in a distributed computing environment, where functions or tasks are performed by a plurality of networked computer devices.

Accordingly, in some embodiments of the present invention, computer processing is provided to enable a user to create or select a dynamic template. In one embodiment, a set of multiple page layout templates is provided on a computer display, wherein each page layout template is designed and constructed in a manner that permits it to retain its design soundness and structural functionality when used in multiple rotational configurations, including, without limitation, rotational configurations at increments of ninety degrees.

The user selects a first page layout template for rendering on a computer display and determines a rotational configuration in which that first page layout template will be used. The user optionally selects a second page layout template to create a two-page spread for rendering on the computer display with the first page layout template, and determines a rotational configuration in which that second page layout template will be used.

The user mounts memorabilia, designs, and/or information items in a design corresponding to the page layout templates selected in previous steps. This can be done electronically to allow the user to quickly see how the mounting will look. For example, the user can designate placement of particular photographs in particular locations, and can rotate the template to determine the preferred orientation and placement. Once completed, the computer device can initiate the print out of the layout to enable the user to create the layout by hand. Alternatively, the print out can be the final product for presentation.

In some embodiments, a page layout template may be provided as a usable instantiation, such as a pre-printed paper intended for use within a photo album or scrapbook. In other embodiments, a page layout template may be provided as an illustration within an instructional guide, where the user may refer to that illustration, including, without limitation, the measurements of the illustration or provided adjacent to the illustration, in order to independently construct a page based upon the information provided in the page layout template. In another embodiment, the template is an electronic orientation that includes pre-established locations that can be used in any rotational orientation.

Thus, as discussed herein, embodiments of the present invention embrace memorabilia storage. In particular, embodiments of the present invention relate to dynamic systems and methods for mounting memorabilia in a manner that provides enhanced opportunity for the creative involvement of users.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for guiding the placement of memorabilia to provide a presentation of the memorabilia, the system on a page comprising:
   two or more pre-designed page layout templates, wherein each of the page layout templates comprises one or more design elements to guide the placement of memorabilia;
   wherein any two of the page layout templates are able to be used adjacent to one another to create a functional design;

wherein each of the page layout templates is individually rotatable around its center in any increment of 90, 180, and 270 degrees;

wherein the design elements of each of the page layout templates are arranged to rotate and change their location by a first rotational amount about a center of their corresponding page layout template when such page layout template is rotated about its center by the first rotational amount;

wherein at least one of the memorabilia is placed in the design element prior to the rotation of the page layout template; and wherein at least one of the design elements on each of the page layout templates retains the placement of at least one of the memorabilia in a first orientation when that design element's corresponding page layout template is rotated by 90 degree increments.

2. The system of claim 1 in which at least one of the design elements comprises one of a photo placement block, a journaling block, a representation of a pocket, a design, a title, a stamped or embossed design, and a representation of a physical object.

3. The system of claim 1 in which the page layout templates are provided as instructional illustrations.

4. The system of claim 1 in which the page layout templates are provided in digital form.

5. The system of claim 1 wherein each of the page layout templates is substantially square shaped.

6. The system of claim 1 wherein each of the page layout templates is able to be swapped with another while each of the page layout templates retains its original orientation from left to right and from top to bottom.

7. A computer program product for implementing within a computer system a method for arranging memorabilia to provide a presentation of the memorabilia, the computer program product comprising:

a non-transitory computer readable medium for providing computer program code means utilized to implement the method, wherein the computer program code means is comprised of executable code for implementing the steps for:

providing a collection of pre-designed page layout templates, wherein each of the page layout templates is square and comprises one or more design elements to guide the placement of memorabilia;

selecting two or more page layout templates from the collection;

placing the selected page layout templates adjacent to one another to create a functional design;

wherein each of the adjacent page layout templates is individually rotatable around its center in any increment of 90, 180, and 270 degrees;

wherein the design elements of each of the page layout templates are arranged to rotate and change their location by a first rotational amount about a center of their corresponding page layout template when such page layout template is rotated about its center by the first rotational amount;

wherein at least one of the memorabilia is placed in the design element prior to the rotation of the page layout template; and wherein at least one of the design elements on each of the page layout templates retains the placement of at least one of the memorabilia in a first orientation when that design element's corresponding page layout template is rotated by 90 degree increments;

selectively rotating a first page layout template of the adjacent page layout templates about its center by the first rotational amount; and mounting the memorabilia in a manner that corresponds to one of the design elements of the adjacent page layout templates.

8. The computer program product of claim 7 wherein at least one of the design elements comprises one of a photo placement block, a journaling block, a representation of a pocket, a design, a title, and a representation of a physical object.

9. The computer program product of claim 7 wherein the computer program code means is further comprised of executable code for implementing a step for rotating a second page layout template of the adjacent page layout templates by a second rotational amount.

10. The computer program product of claim 7 wherein the computer program code means is further comprised of executable code for implementing a step for rendering the adjacent page layout templates onto a first material prior to mounting the memorabilia.

11. A system for guiding the placement of memorabilia to provide a presentation of the memorabilia, the system on a page, comprising:

a computer processor; and a computer readable storage medium for providing computer program code means utilized to implement the method, wherein the computer program code means is comprised of executable code for implementing the steps for:

providing a collection of pre-designed page layout templates;

selecting two or more page layout templates from the collection, wherein each of the page layout templates comprises one or more design elements to guide the placement of memorabilia;

placing the selected two or more page layout templates adjacent to one another to create a functional design;

wherein each of the adjacent page layout templates is individually rotatable around its center in any increment of 90, 180, and 270 degrees;

wherein the design elements of each of the adjacent page layout templates are arranged to rotate and change their location by a first rotational amount about a center of their corresponding page layout template when such page layout template is rotated about its center by the first rotational amount;

wherein at least one of the memorabilia is placed in the design element prior to the rotation of the page layout template; and wherein at least one of the design elements on each of the adjacent page layout templates retains the placement of at least one of the memorabilia in a first orientation when that design element's corresponding page layout templates is rotated to increments of each of 90, 180, and 270 degrees;

selectively rotating a first page layout template of the adjacent page layout templates about its center by the first rotational amount.

12. The computer program product of claim 11, wherein each of the page layout templates is substantially square.

* * * * *